Dec. 20, 1949
F. W. WIEDER
2,491,632
METHODS OF PRODUCING INSECTICIDAL COMPOSITIONS
CONTAINING RELATIVELY SMALL QUANTITIES OF 2,
2-BIS (P-CHLORO-PHENYL)-1,1,1-TRICHLORETHANE
Filed Sept. 9, 1944
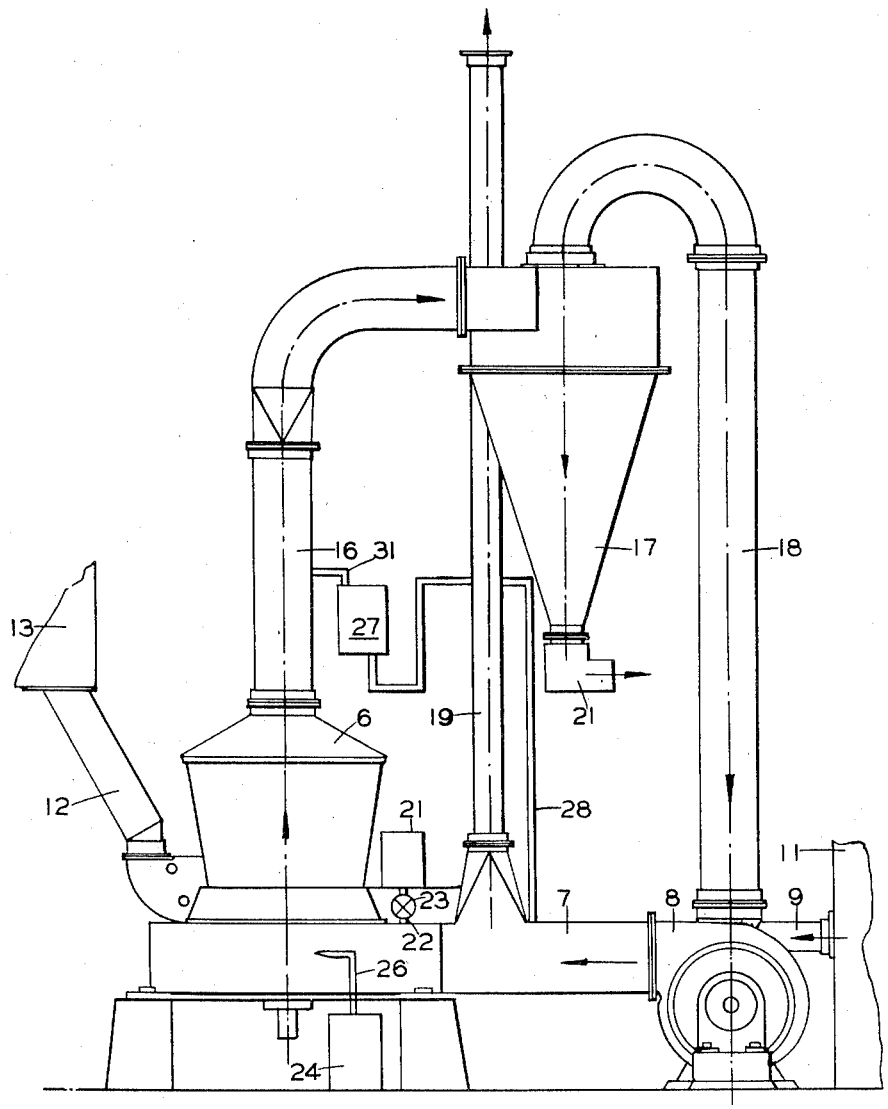
*INVENTOR.*
FERD W. WIEDER
BY
*Attorney.*

UNITED STATES PATENT OFFICE 2,491,632

METHODS OF PRODUCING INSECTICIDAL COMPOSITIONS CONTAINING RELATIVELY SMALL QUANTITIES OF 2,2-BIS(P-CHLOROPHENYL) - 1,1,1 - TRICHLORETHANE

Ferd W. Wieder, Berkeley, Calif., assignor to Stauffer Chemical Company, a corporation of California Application September 9, 1944, Serial No. 553,369

4 Claims. (Cl. 167—20)

This invention relates to improvements in the preparation of insecticidal compositions. The insecticidal utility of 2,2-bis(p-chlorophenyl)-1,1,1-trichlorethane has been pointed out heretofore. This material is sometimes called "DDT."

Continued study of this material has indicated that it is probably toxic to humans and careful residue control must therefore be maintained over any fruits or vegetables likely to be used for human consumption.

The material, 2,2-bis(p-chlorophenyl)-1,1,1-trichlorethane is characterized by its persistent insecticidal utility when deposited in only relatively small amounts. While this is an advantage, it also is a great disadvantage for unless a very considerable period of time passes, normal dosages of the material will persist and will consequently aggravate rather than aid the residue problem. I have discovered that the efficacy of the material is not a function of its concentration except that if one has a greater amount of the material present it will persist for a greater period of time. I have found that the same degree of pest control can be secured with a relatively small amount of material as with a relatively large amount of the same material, the only difference being that the use of the relatively small amount will be effective for a correspondingly shorter period of time. With many crops freedom from the ravages of pests is required for only a relatively short period after which the crop is harvested and is on its way to market for consumption. By reducing the quantity of the material utilized to protect the crop and providing only sufficient to protect the crop throughout its field term, the residue problem is eliminated. When the required pest control period comes to an end, the material has practically all vaporized and disappeared into the atmosphere. Thus, none or only a very small residue of the material remains.

While it is true that a certain economy is effected in utilizing only a reduced portion of the insecticidal material and while this is of some importance, of even greater importance is the residue problem and the solution which the present invention provides for this.

In utilizing the insecticidal material mentioned, it is usual to grind or mix this with carriers to provide a final composition consisting of about 98% of the carrier and 2% of the material. The resulting mixtures are generally spoken of as homogeneous. My investigations indicate that this is not really so. In any case, if one wishes to deposit the material on the carrier to provide only a controlled material persistence and so utilize all the material, the application and mixing must be specially controlled. To accomplish this I provide the insecticidal material in the form of a vapor and mix it with the carrier under such conditions that the vaporized insecticidal material condenses upon each carrier particle to provide a thin, uniform film coating on each carrier particle. In actual practice, such a large amount of carrier is used relative to the insecticidal quantity that the film thickness on the carrier particles is very slight, being comparable to a mono-molecular film in thickness. This extremely uniform deposit makes the resulting mixture very active and effective and I am able to secure the same degree of pest control as can be secured utilizing the presently known mixtures containing much larger percentages of the insecticidal material. However, this control can be secured for only a relatively short period of time, usually a matter of days or weeks, depending upon the particular composition. This much shorter period of control is usually desired for the harvesting of the crop is coordinated with the application of the material so that by the time the crop reaches the market all of the material has disappeared. In the market-place and while the product is being prepared for use, protection against pest ravages is usually unnecessary or can be provided by other materials.

One can provide the material in vapor form by various methods. For example, the material can be discharged as a vapor onto the carrier particles; the heat of comminution can be utilized to vaporize the material if the grinding operation is sufficiently severe; the material can be placed in solution in a solvent and the mixture then vaporized. Various other methods can be employed to provide the material vapor for contact with the carrier. In any case, each carrier particle is uniformly filmed with a coating of the material. Each carrier particle is therefore "activated" and becomes effective in pest control.

It is generally the broad object of the present invention to provide a novel insecticidal material.

Another object of the present invention is to provide a novel practice for the manufacture of insecticidal materials.

A further object of the present invention is to provide for the deposit upon carriers of such materials as "DDT" to the end that the residue problem dependent upon the use of such materials can be minimized.

The invention includes other objects and features of advantage, some of which, together with the foregoing, will appear hereinafter wherein the preferred practice of the invention is disclosed.

In the drawing, the single figure is a diagrammatic showing of certain apparatus which can be employed for carrying out the process of the present invention.

In the form of apparatus which I have chosen as diagrammatic and representative of suitable means for practicing the present invention but to which the invention is in no way limited, I provide a suitable mill 6. This mill can be of any of the well known types utilized for fine grinding of materials such as a Sturtevant or a Raymond mill. It is preferably one through which a current of gas can be passed and in the drawing I have shown a conduit 7 as connecting a blower 8 with the base of the mill. In the grinding of various materials, for example sulphur, it is preferable that the operation be carried out in an inert, non-oxidizing atmosphere so that explosions can be avoided. In the drawing I have shown the intake of the blower 8 as connected by a conduit 9 to a source of inert gas such as a furnace 11 from which a suitably cooled oxygen-free gas is derived.

The carrier material employed is fed from a suitable source 13 into the mill 6 through a pipe 12. In the mill, the carrier material is finely comminuted. The gas stream introduced through pipe 7 carries out particles reduced to a desired size, these being carried through pipe 16 over to a cyclone separator 17. The vertical height of pipe 16 is such that particles which are too heavy to be lifted by the gas stream drop back into the mill and are reground. In the cyclone separator 17, the products collected are drawn off through the valve 21 while return gas is taken back through pipe 18 into the inlet of the blower 9.

In accordance with this invention I introduce into the gas stream entering the base of the mill 6 a suitably vaporized insecticidal material. For example, at 21 I have indicated a container positioned above the mill base and connected to it by a pipe 22 under the control of a valve 23. In the container is placed a solution of one of the aforementioned insecticidal materials, the material being carried in a suitably volatile solvent so that as soon as the liquid is released into the air stream, the material is volatilized and is carried in by the gas stream in pipe 7 into the base of the mill wherein it mixes with the mass of finely divided material suspended in the mill and in pipe 16. The volatilized material condenses as a uniform thin substantially monomolecular film on the surface of each carrier particle.

In place of adding the material in solution it is possible to vaporize the material and at 24 I have indicated a suitably heated container connected by a pipe 26 to the base of the mill. The material to be added to the carrier is placed in the container 24 and is heated to a temperature whereat a vapor stream issues through pipe 26 to mix with the gas stream entering the base of the mill. The quantity of material vaporized can be closely regulated to secure the desired weight of thin uniform film deposit on each carrier particle.

As another manner in which a material can be added I have shown a container 27 connected by a pipe 28 to the pipe 7. Gas under pressure is forced through pipe 28 down through and is released in a body of either a liquified insecticidal material or else a material in solution in a suitable volatile solvent. In any case, the gas issues through pipe 28 into the liquid body in the container and becomes saturated with the insecticidal material. The gas is then passed on through pipe 31 into pipe 16 to come into contact with the flowing suspended stream of finely divided carrier particles and deposit as a film on each of these.

As a suitable carrier material one can employ any of the usual inert finely divided solid materials such as any one of the well known clays, talcs, bentonite, pumice, diatomaceous earth or other dry materials such as walnut shell flour, peach pit flour, wood flour or the like. One can also deposit the insecticidal materials upon materials which are not inert and which posses insecticidal properties in and of themselves, possibly in addition to that of the aforementioned insecticidal material. Such a material is sulphur and I have used a combination of sulphur and the insecticidal material to great advantage. In one case, a Raymond mill was charged with sulphur. At the same time, the previously described system being in operation, five pounds of the material called "DDT" (2,2-bis(p-chlorphenyl)-1,1,1-trichlorethane) were added per ton of sulphur fed to mix with the finely divided sulphur stream in pipe 16. This corresponds to a concentration of one-fourth of one percent of "DDT" on the sulphur (0.25%).

The material was applied as a pest control. Its control was just as effective as were applications of sulphur and "DDT" made up in the usual manner, that is by the usual heterogeneous mixing, and containing a 2% of "DDT." However, the persistence of the first material was only a matter of a few weeks after which only the sulphur remained. The other material lasted for several months.

In place of sulphur, diatomaceous earth was substituted as a carrier material. Two lots were made up, one in the usual heterogeneous mixing manner and the other according to the present invention. The quantities of "DDT" employed were respectively 2% and 0.25%. The pest controls secured were quite comparable; however, that material made up in accordance with this invention gave just as good a control as did the material containing a larger percentage. However, its persistence was a matter of about two weeks after which the material had disappeared and only traces or a slight residue of the carrier remained. The persistence of the other material was evident even after several months.

The controlled persistence and effectiveness of the material of the present invention is particularly desirable when the material is employed to protect crops against pests which are also subject to attack by natural predators. Too long a persistence may destroy the predators or render them unable to control the pest in a period when a pest control material cannot be employed. In either case, the utility of the predators is destroyed. By utilizing a material of relatively short life, one having a definite control period, the predators need not be destroyed and the natural balance can be maintained.

I claim:

1. A method of making an insecticidal composition comprising vaporizing 2,2-bis(p-chlorophenyl)-1,1,1-trichlorethane into a gas stream, grinding a mass of a carrier to finely divided form, passing said gas stream through said mass of finely divided carrier in a comminution zone while the carrier is undergoing grinding and comminution to subject the deposited 2,2-bis(p-chlorophenyl)-1,1,1-trichlorethane to grinding and comminution in said zone to deposit the 2,2-bis-(p-chlorophenyl)-1,1,1-trichlorethane thereon in finely divided form before the carrier leaves the comminution zone, and separating the gas stream from the carrier.

2. The process of claim 1 wherein the carrier is sulphur.

3. A method of making an insecticidal composition comprising dissolving 2,2-bis(p-chlorophenyl)-1,1,1-trichlorethane in a volatile solvent to form a solution, grinding a mass of carrier to comminute the carrier to finely divided form in a comminution zone, discharging a stream of said solution into a gas stream to vaporize the same in said gas stream and then passing said stream through said mass of finely divided carrier while the carrier is undergoing grinding and comminution to deposit the 2,2-bis(p-chlorophenyl)-1,1,1-trichlorethane thereon in finely divided form before the carrier leaves the comminution zone to subject the 2,2-bis(p-chlorophenyl)-1,1,1-trichlorethane to grinding and comminution, and separating the gas stream from the carrier.

4. The process of claim 3 wherein the carrier is sulphur.

FERD W. WIEDER.

REFERENCES CITED

The following references are of record in the file of this patent:

UNITED STATES PATENTS

| Number | Name | Date |
| --- | --- | --- |
| Re. 22,700 | Muller | Dec. 4, 1945 |
| 1,585,058 | Volck | May 18, 1926 |
| 2,213,215 | Hester | Sept. 3, 1940 |
| 2,349,814 | Deonier et al. | May 30, 1944 |
| 2,365,047 | Bousqyet | Dec. 12, 1944 |
| 2,414,193 | Durham | Jan. 14, 1947 |